(12) United States Patent
Alpay et al.

(10) Patent No.: US 8,723,076 B2
(45) Date of Patent: May 13, 2014

(54) ON-THE-FLY MANIPULATION OF SPOT SIZE AND CUTTING SPEED FOR REAL-TIME CONTROL OF TRENCH DEPTH AND WIDTH IN LASER OPERATIONS

(75) Inventors: Mehmet E. Alpay, Portland, OR (US); Brian Johansen, Hillsboro, OR (US); David Childers, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 132 days.

(21) Appl. No.: 13/399,856

(22) Filed: Feb. 17, 2012

(65) Prior Publication Data

US 2012/0145686 A1 Jun. 14, 2012

Related U.S. Application Data

(62) Division of application No. 12/060,043, filed on Mar. 31, 2008, now Pat. No. 8,124,911.

(51) Int. Cl.
*B23K 26/08* (2014.01)
*H01L 39/24* (2006.01)

(52) U.S. Cl.
USPC ............ 219/121.68; 250/492.22; 250/492.23; 372/9

(58) Field of Classification Search
USPC ............. 219/121.68, 121.69, 121.78, 121.82; 438/33, 463; 250/492.22, 492.23; 372/9; 264/400, 482, 157, 158, 163
See application file for complete search history.

(56) References Cited

U.S. PATENT DOCUMENTS

| | | | |
|---|---|---|---|
| 4,029,932 A | 6/1977 | Cook | |
| 4,768,043 A | 8/1988 | Saito et al. | |
| 5,136,413 A * | 8/1992 | MacDonald et al. | 359/213.1 |
| 5,198,926 A | 3/1993 | Sheinis et al. | |
| 5,298,975 A * | 3/1994 | Khoury et al. | 356/624 |
| 5,621,561 A | 4/1997 | Belfatto et al. | |

(Continued)

FOREIGN PATENT DOCUMENTS

| | | |
|---|---|---|
| CN | 1788916 A | 6/2006 |
| JP | 58154481 A | 9/1983 |
| JP | 1513935 A | 11/1999 |
| JP | 2007136481 A | 6/2007 |

OTHER PUBLICATIONS

International Search Report and Written Opinion for PCT/US2009/038080, mailed Mar. 24, 2009.
Office Action for U.S. Appl. No. 12/060,43, mailed May 16, 2011.

(Continued)

*Primary Examiner* — Samuel M Heinrich
(74) *Attorney, Agent, or Firm* — Stoel Rives LLP

(57) ABSTRACT

Systems and methods cut trenches of multiple widths in a material using a single pass of a laser beam. A first series of laser pulses cut a work surface of the material at a first cutting speed using a first spot size. In a transition region from a first trench width to a second trench width, a second series of laser pulses sequentially change spot sizes while gradually changing from the first cutting speed to a second cutting speed. Then, a third series of laser pulses continue to cut the work surface at the second cutting speed using a second spot size. The method provides for increased depth control in the transition region. A system uses a selectively adjustable optical component in the laser beam path to rapidly change spot size by adjusting a position of a focal plane with respect to the work surface.

12 Claims, 7 Drawing Sheets

(56) References Cited

U.S. PATENT DOCUMENTS

| | | |
|---|---|---|
| 5,635,267 A | 6/1997 | Yamada et al. |
| 5,667,707 A | 9/1997 | Klingel et al. |
| 6,376,797 B1 * | 4/2002 | Piwczyk et al. ......... 219/121.72 |
| 6,407,363 B2 | 6/2002 | Dunsky et al. |
| 6,483,071 B1 | 11/2002 | Hunter et al. |
| 6,676,878 B2 | 1/2004 | O'Brien et al. |
| 6,875,950 B2 | 4/2005 | Naumov et al. |
| 6,966,649 B2 | 11/2005 | Shadduck |
| 7,157,038 B2 | 1/2007 | Baird et al. |
| 7,388,172 B2 | 6/2008 | Sercel et al. |
| 2002/0190037 A1 | 12/2002 | Steur et al. |
| 2002/0198622 A1 | 12/2002 | Dinauer et al. |
| 2007/0108170 A1 | 5/2007 | Costin et al. |
| 2008/0067155 A1 | 3/2008 | Gu |

OTHER PUBLICATIONS

Notice of Allowance for U.S. Appl. No. 12/060,043, mailed Feb. 8, 2012.

* cited by examiner

ON-THE-FLY MANIPULATION OF SPOT SIZE AND CUTTING SPEED FOR REAL-TIME CONTROL OF TRENCH DEPTH AND WIDTH IN LASER OPERATIONS

RELATED APPLICATION

This application is divisional of U.S. patent application Ser. No. 12/060,043, filed Mar. 31, 2008, which is hereby incorporated by reference herein in its entirety.

TECHNICAL FIELD

This disclosure relates to processing materials with lasers. In particular, this disclosure relates to real-time control of trench depth and width through on-the-fly manipulation of spot size and cutting speed in laser micro-machining applications.

BACKGROUND INFORMATION

A typical routing application using a laser micro-machining system involves the delivery of laser energy to a substrate while the beam and/or the substrate itself is moving. In most cases, the energy delivery rate (the "power on the work surface") and the rate at which the beam and/or the substrate moves (the "cutting speed") are maintained at constant values to provide uniformity of the kerf or "trench" width and depth throughout the cut. The depth and the width of the resulting trench are governed by the beam spot size on the work surface, the energy of each laser pulse, the spatial separation between consecutive pulses (the "bite size"), and the laser-material interaction characteristics.

Generally, one or more of the spot size, pulse energy, and/or bite size are adjusted in order to cut trenches of different cross-sectional geometries on the same substrate. In typical laser micro-machining, changing one of these three system settings causes the system to process trenches with different cross-section geometries in different "passes." For example, the system may process trenches of one type, change one or more of the three settings, then process trenches that correspond to the new settings. This process may be repeated for each type of trench. This simple approach is typically referred to as a "multi-pass" process.

The conventional multi-pass process for merging trenches of different widths discussed above has a number of problems. For example, processing trenches of different widths in different passes generally means that a beam-positioner will return to the same spot where it finished a trench in a previous pass to start routing a new trench having a different width. This places a significant demand on the repeatability of the beam positioner subsystem. It also typically reduces overall system throughput.

Another problem with using multi-pass processing to cut trenches of different geometries is that, even if the system repeatability/accuracy concerns were addressed, it is difficult to maintain constant depth throughout a transition region because of the differences between wall angles of trenches with different widths.

FIGS. 1, 2, and 3 illustrate the difficulty of maintaining a constant peak cumulative energy distribution within a transition region (e.g., when changing from one spot size to another spot size in multiple passes to achieve different trench widths). FIG. 1 includes two graphs (a two-dimensional graph and a three dimensional graph) representing a spatial distribution of cumulative pulse energy density resulting from an abrupt transition in spot size and cutting speed using a Gaussian spots. The cumulative pulse energy density shown in FIG. 1 corresponds, for example, to a two-pass implementation with substantially perfect repeatability. In this example, the first pass uses a 10 µm spot size and a 3 µm bite size. The second pass uses a 20 µm spot size and a 1.5 µm bite size. The two-dimensional graph in FIG. 1 conceptually illustrates the widening of the trench in a transition region 110. The three-dimensional graph in FIG. 1 illustrates a fluctuation 112 in the peak cumulative energy distribution within the transition region 110.

FIG. 2 also includes two graphs (a two-dimensional graph and a three dimensional graph) representing a spatial distribution of cumulative pulse energy density resulting from a two-pass implementation when a second (thicker) trench placement is misaligned by 3 µm due to a repeatability error. As before, both passes use Gaussian spots. The first pass uses a 10 µm spot size and a 3 µm bite size. The second pass uses a 20 µm spot size and a 1.5 µm bite size. The two-dimensional graph in FIG. 2 conceptually illustrates the widening of the trench in a transition region 210. The three-dimensional graph in FIG. 2 illustrates a fluctuation 212 in the peak cumulative energy distribution within the transition region 210.

FIG. 3 is a graph illustrating differences between the peak cumulative energy densities from the two abrupt transition scenarios illustrated in FIGS. 1 and 2. As shown, both the repeatable scenario and the scenario with the 3 µm repeatability error result in substantial fluctuations 112, 212 within their respective transition regions 110, 210. Both fluctuations 112, 212 in peak cumulative energy densities may result in undesirable changes in depth within the transition regions 110, 210.

SUMMARY OF THE DISCLOSURE

Systems and methods cut trenches of multiple widths in a material using a single pass of a laser beam. Trench depth control is maintained in a transition region between sections of the trench having different widths.

In one embodiment, a method is provided for cutting a trench of multiple widths in a material with a single pass of a laser beam. The method includes, at a first cutting speed of the laser beam with respect to a work surface of the material, cutting the work surface using a first series of laser pulses. Each laser pulse in the first series has a first spot size at the work surface. In a transition region, the method includes gradually changing from the first cutting speed at a beginning of the transition region to a second cutting speed at an end of the transition region. As the cutting speed gradually changes in the transition region, the method includes cutting the work surface with a second series of laser pulses. The second series of laser pulses sequentially change spot sizes from the first spot size at the beginning of the transition region to a second spot size at the end of the transition region. Then, at the second cutting speed of the laser beam, the method continues to cut the work surface using a third series of laser pulses that each has the second spot size.

In another embodiment, a system for cutting a trench of multiple widths in a material with a single pass of a laser beam includes a laser source to generate the laser beam and a first optical component to receive the laser beam. The first optical component is selectively adjustable to change a position of a focal plane with respect to a work surface of the material. The system also includes a second optical component to direct the laser beam to the work surface of the material. During a transition between a first trench width and a second trench width cut into the work surface by the laser beam, a cutting speed between the laser beam and the work surface gradually changes and the first optical component undergoes a series of changes to sequentially change spot sizes at the work surface.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
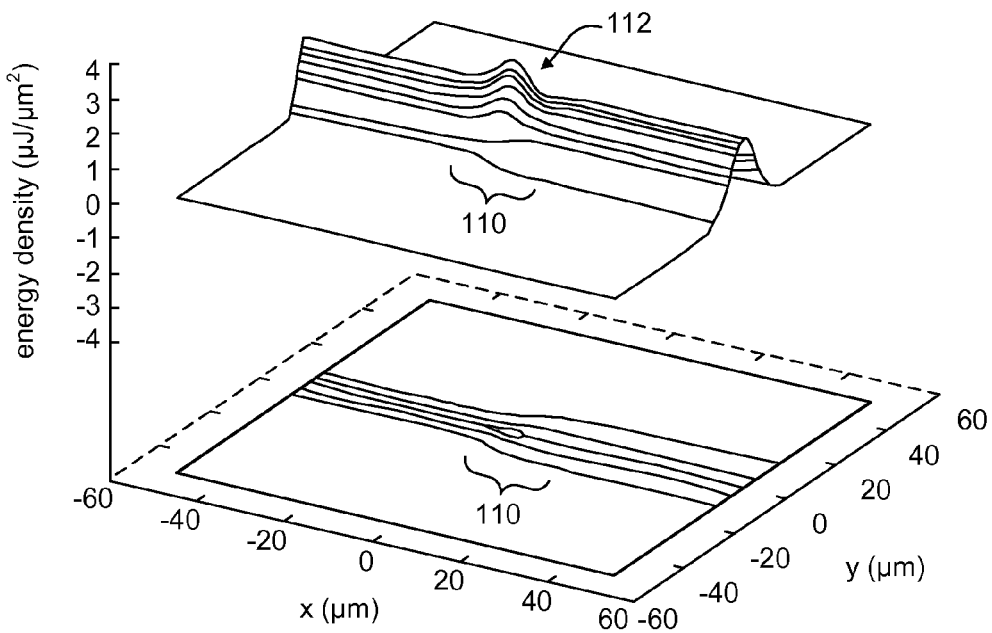
FIGS. 1 and 2 are graphs representing spatial distributions of cumulative pulse energy densities corresponding to respective conventional laser processing systems when abruptly transitioning from one trench width to another trench width.

Laser processing systems and methods disclosed herein allow trenches of different widths to be "merged" while maintaining substantially the same depth throughout a transition region. In one embodiment, a method to circumvent the problems of multi-pass processing outlined above includes manipulating the spot size and cutting speed "on-the-fly" to achieve a smooth transition between merged trenches of different widths while maintaining depth control throughout the transition region.

On-the-fly manipulation of spot size and cutting speed enables continuous transitions between trenches of different widths. This, in turn, enables the processing of different types of trenches in a single-pass. Thus, the concerns about system accuracy and repeatability of the beam positioner subsystem are reduced or eliminated. Furthermore, continuous manipulation of cutting speed during changes in spot size provides a second degree of freedom that in turn enables the laser system to maintain a constant trench depth throughout the transition region.

To a first-order approximation, trench geometry is expected to be a scaled version of the cumulative energy distribution (in space) of the laser pulses delivered to a work surface while forming the trench. Consequently, maintaining a constant cumulative peak energy density while transitioning from one trench width to another trench width provides good depth control throughout the transition region. Thus, in certain embodiments disclosed herein, simultaneous manipulation of spot size and cutting speed allows changes in trench width while maintaining good depth control. Accordingly, disclosed herein is a method for calculating the temporal profiles for spot size and cutting speed during such a transition. The solution to this problem discussed below is specific to Gaussian spots. However, an artisan will recognize from the disclosure herein that similar solution techniques may be applied for other spot geometries as well.

Let the spatial energy distribution, E(r), associated with a laser pulse having a Gaussian spot be described as:

$$E(r)=A*\exp(-r^2/2*\text{sigma}^2),$$

where A is the energy amplitude, r is the distance from the center of the Gaussian spot, and sigma is the distance from the center of the Gaussian spot at which the intensity is half way between the center intensity and the background intensity. It can be shown that the cumulative peak energy density, E_peak, resulting from an infinite sequence of such pulses that are uniformly spaced by a bite size of "delta" can be approximated by:

$$E\_peak=A*\text{sigma}*\text{sqrt}(2*\text{pi})/\text{delta}.$$

It should be noted that this "approximate equation" is very accurate for delta<=2*sigma (e.g., approximately 1% worst-case mismatch between the series value and the analytical expression).

The total energy for each pulse, E_pulse, can be computed through volume integration of E(r) in cylindrical coordinates (wherein r is integrated from 0 to infinity, and r's angular offset, theta, is integrated from 0 to 2*pi) to yield:

$$E\_pulse=A*2*\text{pi}*\text{sigma}^2.$$

When the spot size changes from a spot size SS1 to a spot size SS2, using the standard $1/e^2$ diameter as the spot size, then:

$$SS1=4*\text{sigma1 and }SS2=4*\text{sigma2}.$$

Because the total energy under the two pulse types should remain the same, there exists the following relationship between the amplitudes:

$$A1*\text{sigma1}^2=A2*\text{sigma2}^2 => A1*SS1^2=A2*SS2^2.$$

To maintain the same value for E_peak:

$$A1*\text{sigma1}*\text{sqrt}(2*\text{pi})/\text{delta1}=A2*\text{sigma2}*\text{sqrt}(2*\text{pi})/\text{delta2} => A1*SS1/\text{delta1}=A2*SS2/\text{delta2},$$

wherein the bite size changes from delta1 to delta2. These equations may be combined to obtain the following relationship between the bite sizes delta1 and delta2:

$$SS1*\text{delta1}=SS2*\text{delta2}.$$

The temporal change in spot size during a transition is given by SS(t), where SS(0)=SS1 and SS(T)=SS2. In this expression, t=0 denotes the start of a transition and t=T denotes the end of the transition. Assuming that the bite size prior to the start of transition is "delta1," the temporal profile of the bite size during the transition, "delta(t)", can be calculated from:

$$SS1*\text{delta1}=SS(t)*\text{delta}(t)=>\text{delta}(t)=SS1*\text{delta1}/SS(t).$$

Note that delta(T) at the end of transition becomes:

$$\text{delta}(T)=SS1*\text{delta1}/SS(T)=SS1*\text{delta1}/SS2=\text{delta2}.$$

Thus, delta(T) satisfies the boundary condition delta(T)=delta2.

There is a proportional relationship between bite size "delta" and cutting speed "Vc." Given a pulse repetition frequency (PRF), this relationship is given by $$Vc=delta*PRF.$$

Hence, the temporal profile for cutting speed can be obtained from:

$$Vc(t)=delta(t)*PRF(t)=PRF(t)*SS1*delta1/SS(t).$$

If the pulse repetition frequency is maintained at a constant rate throughout, this relationship can be further simplified in the following manner:

$$Vc1=delta1*PRF \Rightarrow delta1=Vc1/PRF;$$

$$Vc2=delta2*PRF \Rightarrow Vc(t)=PRF*SS1*delta1/SS(t)=$$

$$PRF*SS1*Vc1/(PRF*SS(t))=Vc1*SS1/SS(t).$$

As a sanity check:

$$Vc(T)=Vc1*SS1/SS(T)=Vc1*SS1/SS2=$$

$$PRF*(delta1*SS1/SS2)=PRF*delta2=Vc2,$$

which again satisfies the boundary condition Vc(T)=Vc2 at the end of this transition.

It should be noted that the algorithm developed in the above analysis is "approximate" by its very nature as the "intermediate" pulses during a transition will not have infinitely many "siblings" surrounding them. As a result, the peak energy distribution calculations from which the above equations are derived will only be "approximately" satisfied during transition. Nevertheless, it is expected that the relationship established between spot size and cutting speed profiles will be sufficient in most cases and can also serve as a starting point for further refinements, if necessary.

As an example, the algorithms above are applied to the following problem: SS1=10 µm; delta1=3 µm; SS2=20 µm; and delta2=SS1*delta1/SS2=10*3/20=1.5 µm. In other words, a Gaussian laser beam changes from a 10 µm spot size and a 3 µm bite size to a 20 µm spot size and a 1.5 µm bite size in a single pass. In this example, it is assumed that the spot size is changed as a linear function of time during the transition.

A first scenario in this example includes a "fast" transition in which the spot size changes by 1 µm per pulse. A second scenario in this example includes a "slow" transition in which the spot size changes 0.5 µm per pulse. Note that the pulse repetition rate is assumed to remain constant throughout the transition in both cases. Thus, the assertion that spot size is changing as a linear function of time translates into a constant rate of change in spot size on a per pulse basis.

Figure 4:
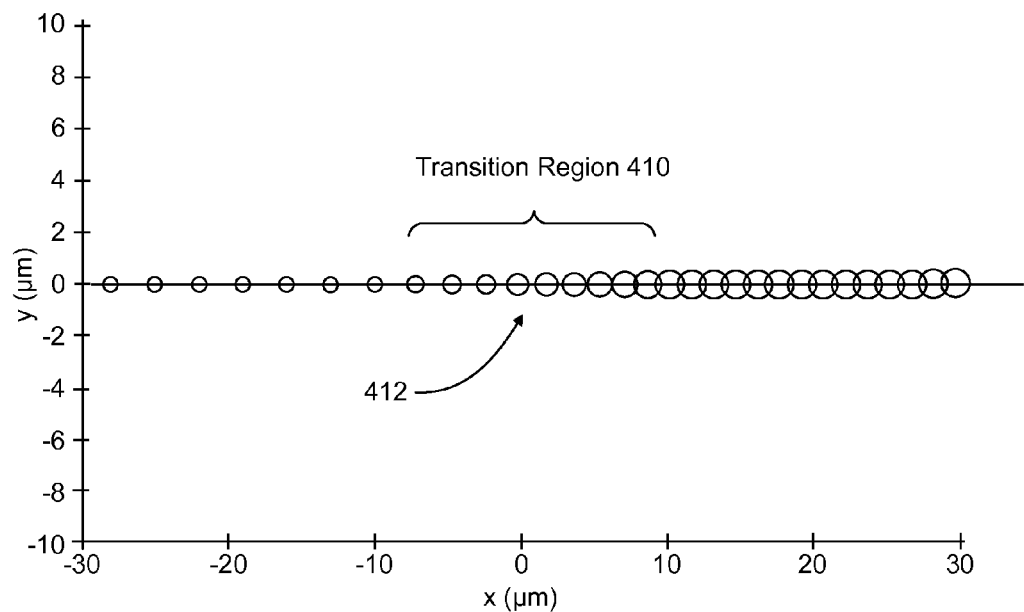
FIG. 4 is a graph of pulse locations and spot sizes for a "fast" transition scenario according to an example embodiment.

FIG. 4 is a graph of pulse locations (along the x-axis) and spot sizes for the "fast" transition scenario. In a transition region 410, ten laser pulses 412 uniformly increase in spot size from 10 µm to 20 µm. The distribution for the second, "slow," scenario is similar to that shown in FIG. 4, but includes twice as many intermediate pulses during transition.

Figure 5:
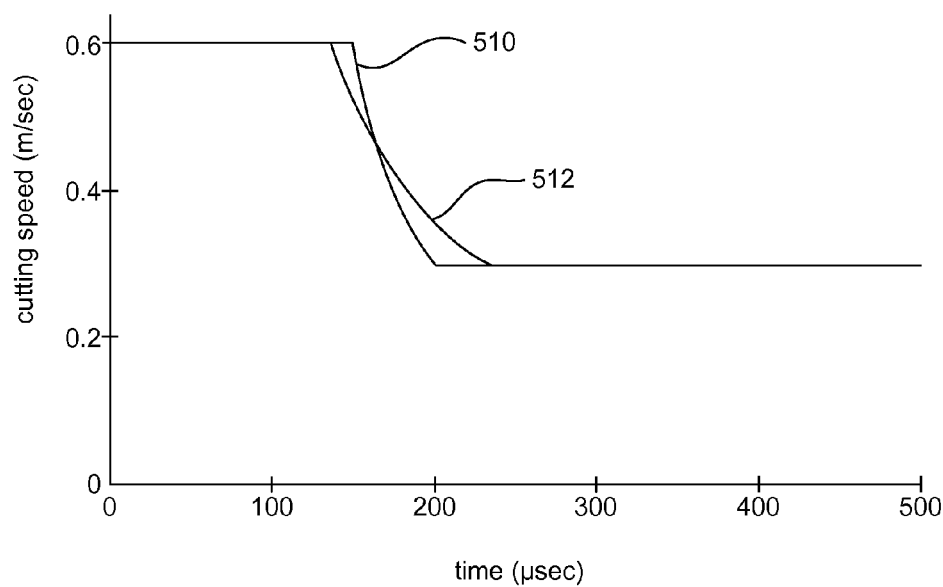
FIG. 5 is a graph representing temporal profiles of cutting speeds corresponding to linearly increasing intermediate spot sizes for "fast" and "slow" transitions according to the example embodiment of FIG. 4.

FIG. 5 is a graph representing temporal profiles of cutting speeds corresponding to linearly increasing intermediate spot sizes for the "fast" (profile 510) and "slow" (profile 512) transitions in this example embodiment. The cutting speed profiles 510, 512 are calculated from the formulae developed above.

Figure 2:
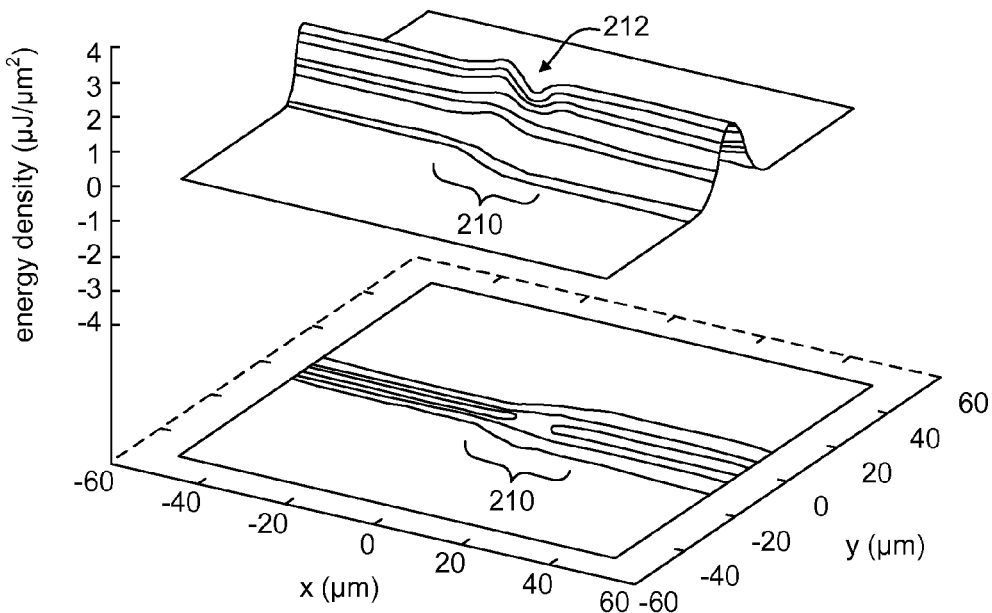
Figure 3:
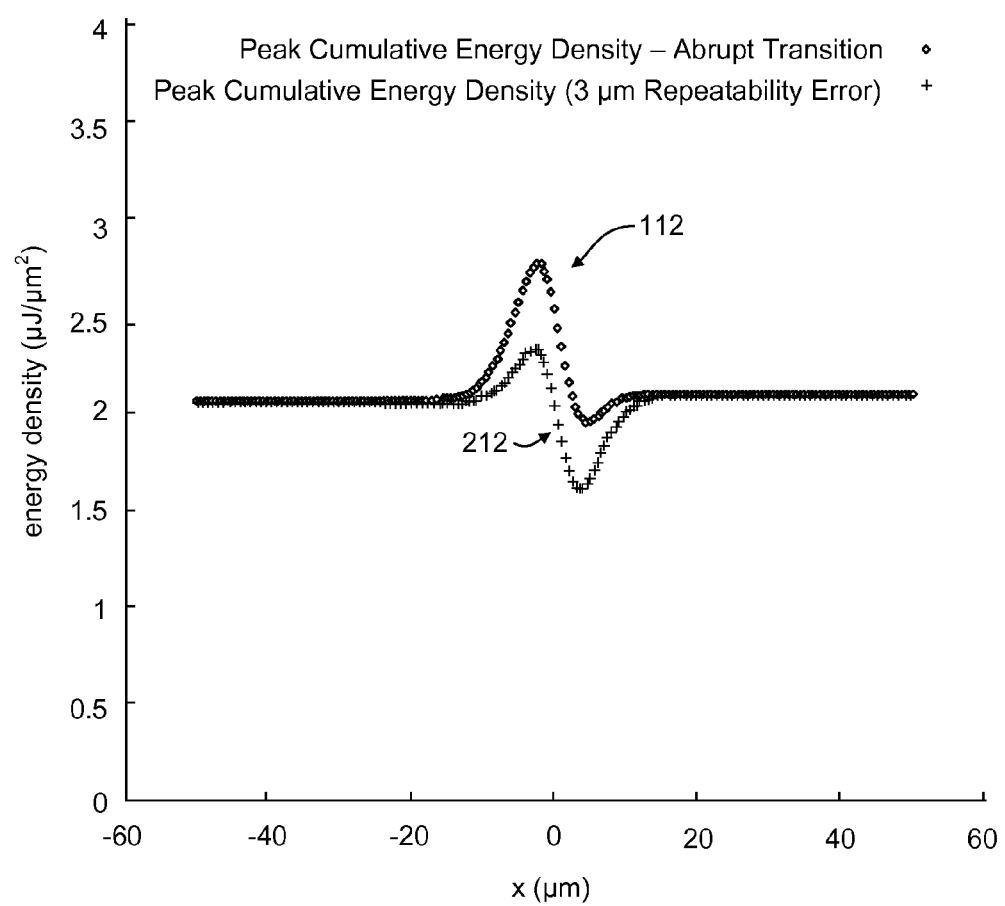
FIG. 3 is a graph illustrating the difference between the peak cumulative energy densities from the two abrupt transition scenarios illustrated in FIGS. 1 and 2.
Figure 6:
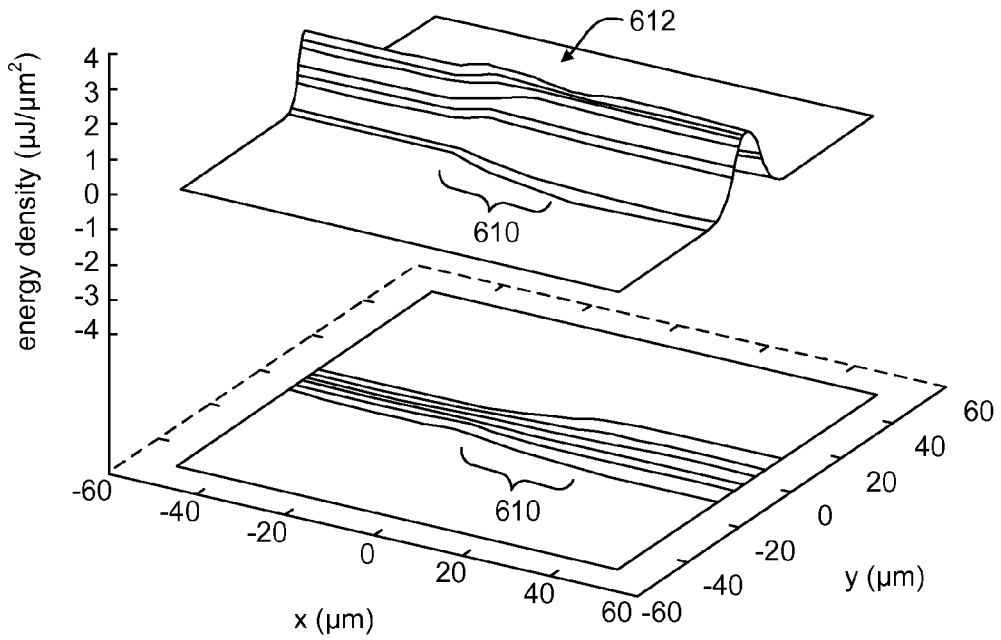
FIG. 6 is a graph representing an energy density distribution resulting from the fast transition according to the example embodiment of FIGS. 4 and 5.
Figure 7:
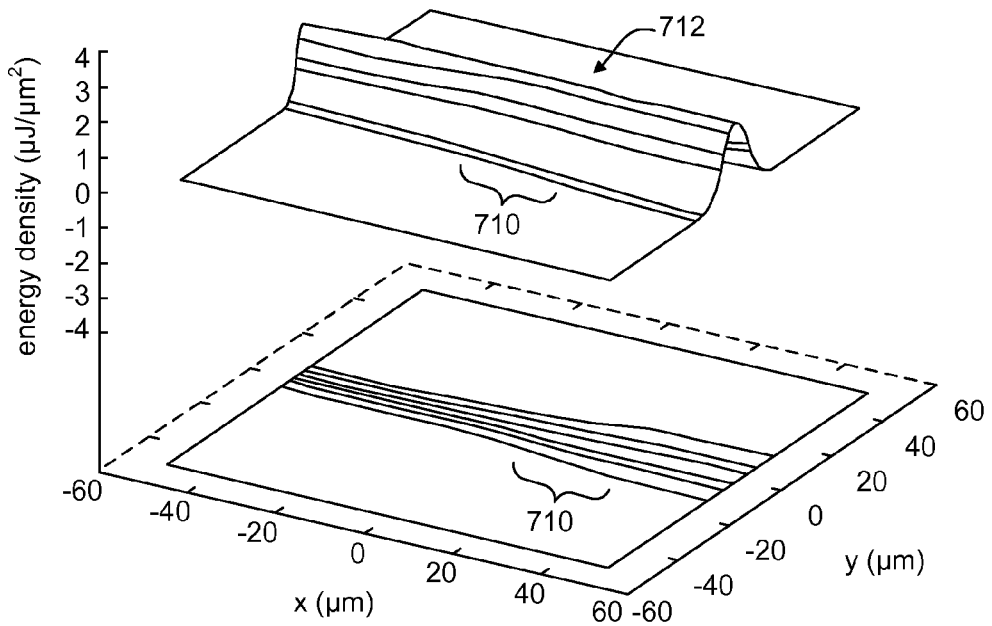
FIG. 7 is a graph representing an energy density distribution resulting from the slow transition according to the example embodiment of FIGS. 4 and 5.
Figure 8:
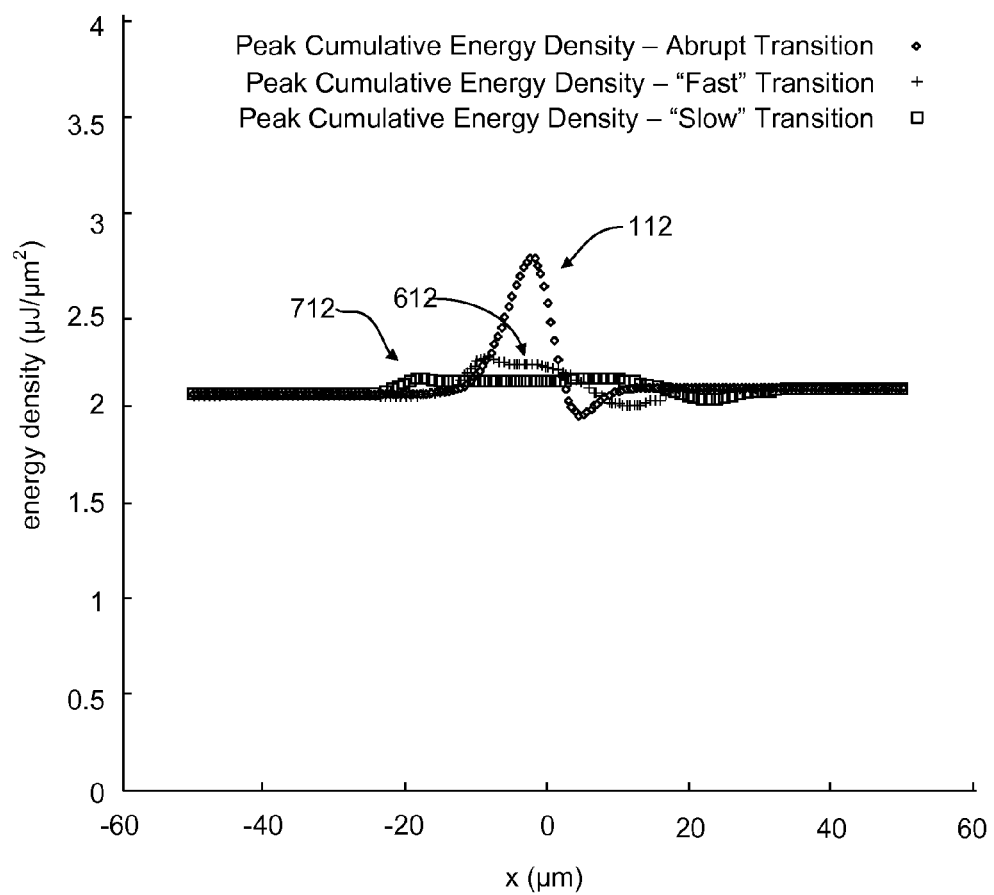
FIG. 8 is a graph representing a comparison of the peak energy density variation through the transition region for three different scenarios according to the example embodiments of FIGS. 4 and 5.

FIGS. 6, 7, and 8 illustrate the improvement in maintaining a constant peak cumulative energy distribution within a transition region (as compared to that of conventional multi-pass processing shown in FIGS. 1, 2, and 3). FIG. 6 includes two graphs (a two-dimensional graph and a three dimensional graph) representing an energy density distribution resulting from the fast transition. In this example fast transition, there are ten intermediate pulses of uniformly increasing spot size in a transition region 610. The two-dimensional graph in FIG. 6 conceptually illustrates the widening of the trench in the transition region 610. The three-dimensional graph in FIG. 6 illustrates a substantial reduction in fluctuation 612 in the peak cumulative energy distribution within the transition region 610, as compared to that of FIGS. 1 and 2.

FIG. 7 also includes two graphs (a two-dimensional graph and a three dimensional graph) representing an energy density distribution resulting from the slow transition. In this example slow transition, there are twenty intermediate pulses of uniformly increasing spot size in a transition region 710. The two-dimensional graph in FIG. 7 conceptually illustrates the widening of the trench in the transition region 710. The three-dimensional graph in FIG. 7 illustrates a substantial reduction in fluctuation 712 in the peak cumulative energy distribution within the transition region 610, as compared to that of FIGS. 1, 2, and 6.

FIG. 8 is a graph representing differences between the peak cumulative energy densities for the transition scenarios illustrated in FIGS. 1, 6 and 7. As shown in FIG. 8, the abrupt transition scenario of FIG. 1 (with no repeatability error when assuming a two-pass implementation) has a substantially greater fluctuation 112 than both of the fluctuation 612 of the fast transition scenario of FIG. 6 (using ten intermediate pulses) and the fluctuation 712 of the slow transition scenario of FIG. 7 (using twenty intermediate pulses). Thus, the gradual manipulation of spot size along with cutting speed as described herein yields much less variation in peak cumulative energy density as compared to an "abrupt" transition. Further, as observed from the approximate nature of the algorithms described herein, the fluctuation 712 of the slower transition is less than the fluctuation 612 of the faster transition.

The spot size at a work surface of a workpiece may be changed, for example, by changing the relative distance between a focusing (scan) lens and the work surface. This may be accomplished by either moving the focusing lens or a chuck that holds the workpiece. In another embodiment, the spot size at the work surface may be changed by changing the effective focal plane by manipulating an optical component in the beam path.

Of these two approaches, changing the relative distance between the focusing lens and the work surface may not be a practical solution for "on-the-fly" changes in trench widths. As the name "on-the-fly" spot size adjustment suggests, the amount of time within which changes in spot size are made is very small (e.g., on the order of approximately 0.1 msec). It may be difficult or impossible to move large and heavy objects such as the scan lens or the chuck in this amount of time. Thus, in one embodiment, other "smaller/easier-to-move" components in the optical path are adjusted to change the spot size by changing the effective focal length of the laser beam.

Figure 9:
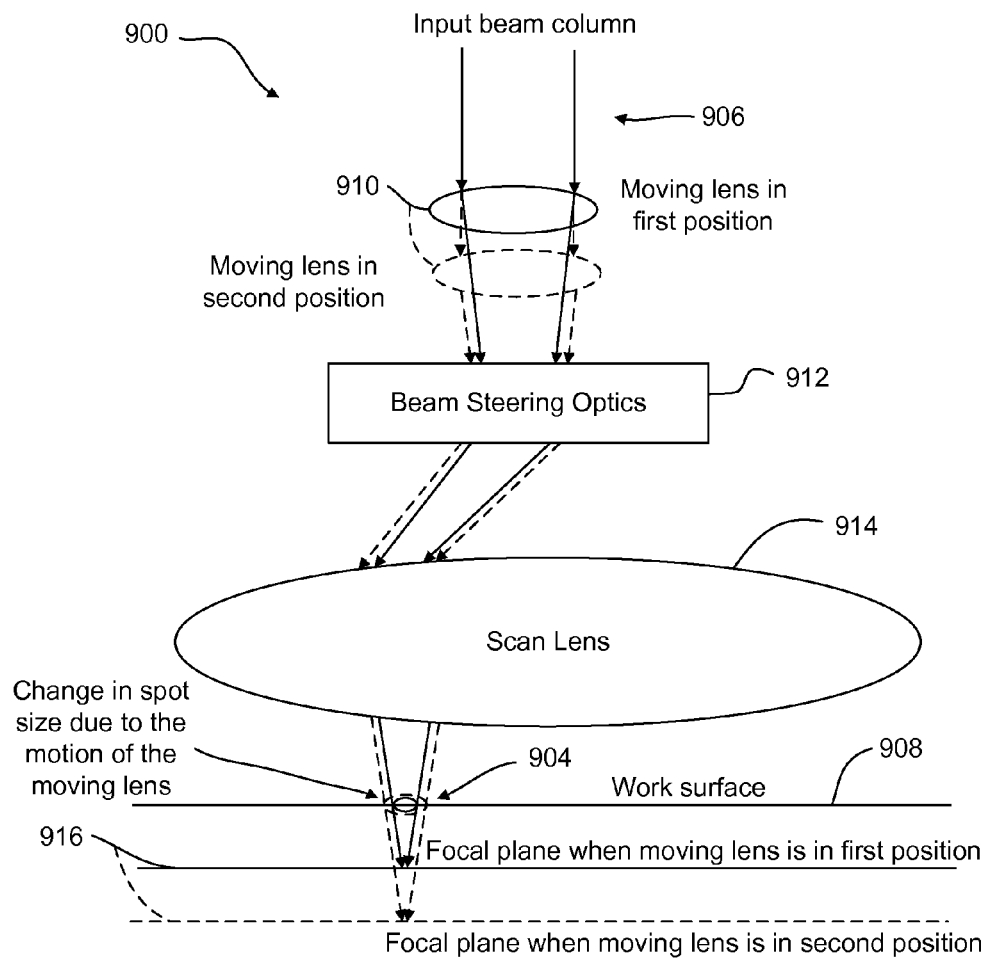
FIG. 9 is a block diagram of an apparatus for rapid manipulation of work surface spot size by moving a weak lens located prior to beam steering subsystem and the scan lens.

FIG. 9 is a block diagram of a system 900 for rapidly manipulating a spot size 904 of a laser beam 906 at a work surface 908 according to one embodiment. The system 900 includes a weak moving lens 910, beam steering optics 912, and a scan lens 914 in an optical path of the input laser beam 906. The weak moving lens 910 and the scan lens 914 function as a "composite" lens to change the system's effective focal length. Thus, the location of a focal plane 916 changes as a function of the distance between the weak moving lens 910 and the scan lens 914. Consequently, the focal plane 916 may be "moved" by moving the weak lens 910 without moving the scan lens 914. In one embodiment, the lens 910 is a multi-lens element in which one or more lens elements are configured to move relative to the scan lens 914 to change the location of the focal plane 916.

Changing the location of the focal plane 916 changes the spot size 904 at the work surface 908. For example, FIG. 9 shows the weak moving lens 910 in a first position (shown with a solid line) and in a second position (shown with a phantom line). When the weak moving lens 910 is in the first position, the focal plane 916 is at a first location (shown with a solid line) relative to the work surface 908. Thus, the laser beam 906 forms a first spot size 904 (shown with a solid line) at the work surface 908. After the weak moving lens 910 is moved to the second position, the focal plane 916 is at a second location (shown with a phantom line) relative to the work surface 908. Thus, the laser beam 906 forms a second spot size 904 (shown with a phantom line) at the work surface 908.

The scan lens 914 may include multiple optical elements and may be large and heavy as compared to the weak moving lens 910. Thus, the scan lens 914 may be difficult to move at high velocities. The weak moving lens 910, on the other hand, may be approximately as small as the diameter of the input laser beam 906 and may include only one or two optical elements. Thus, the weak moving lens 910 is substantially lighter than the scan lens 914 and is much easier to move at high velocities.

Figure 10:
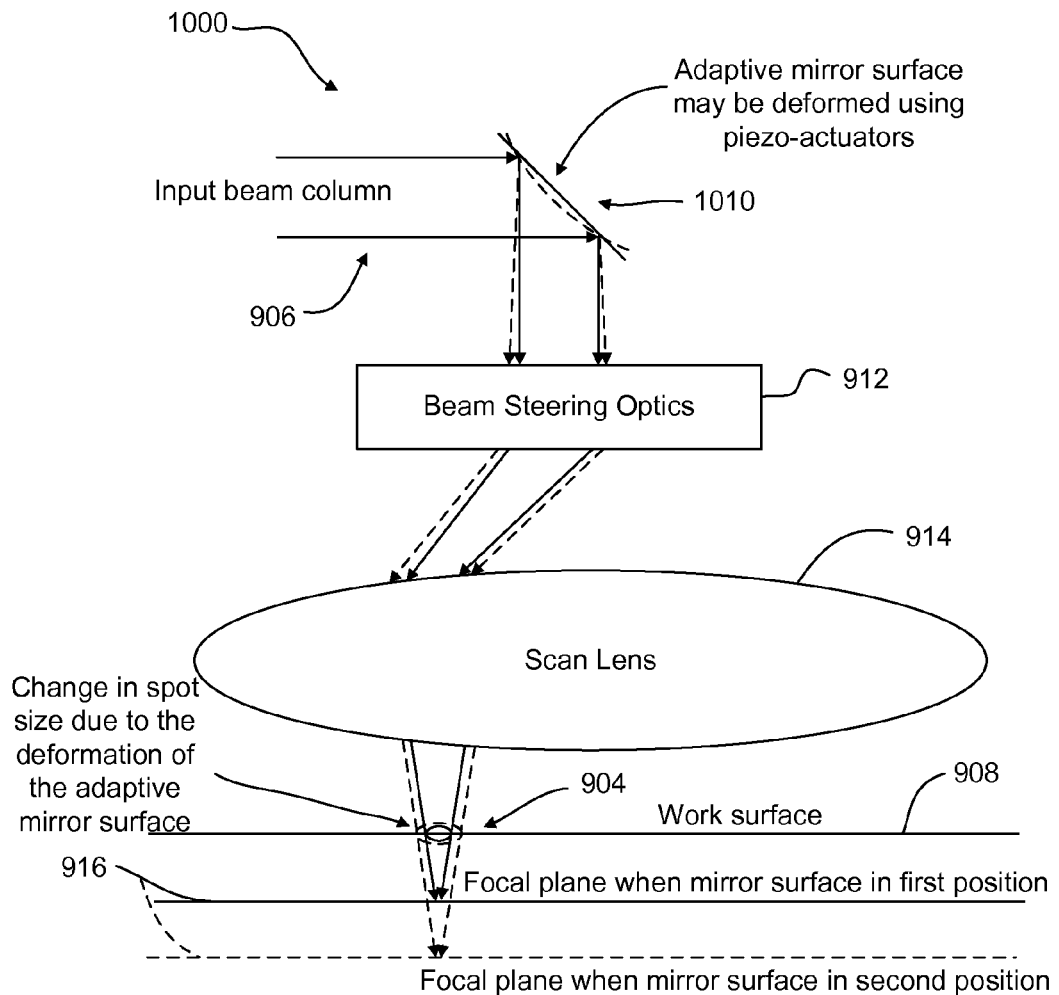
FIG. 10 is a block diagram of an apparatus for rapid manipulation of work surface spot size by manipulating the surface curvature of an "adaptive" mirror located prior to beam steering subsystem and the scan lens.

FIG. 10 is a block diagram of a system 1000 for rapidly manipulating a spot size 904 of a laser beam 906 at a work surface 908 according to another embodiment. The system 1000 includes an adaptive lens or mirror 1010, beam steering optics 912, and a scan lens 914 in an optical path of the input laser beam 906. The surface curvature of the adaptive lens or mirror 1010 may be externally manipulated (e.g., using piezo-actuators) to change the system's focal length.

For example, FIG. 10 shows the surface of the adaptive lens or mirror 1010 in a first position (shown with a solid line) and in a second position (shown with a phantom line). When the surface of the adaptive lens or mirror 1010 is in the first position, the focal plane 916 is at a first location (shown with a solid line) relative to the work surface 908. Thus, the laser beam 906 forms a first spot size 904 (shown with a solid line) at the work surface 908. After the surface of the adaptive lens or mirror 1010 is moved to the second position, the focal plane 916 is at a second location (shown with a phantom line) relative to the work surface 908. Thus, the laser beam 906 forms a second spot size 904 (shown with a phantom line) at the work surface 908. Because the surface of the adaptive lens or mirror 1010 may be rapidly changed, the spot size 904 at the work surface 908 may be rapidly adjusted.

The embodiments disclosed herein improve process throughput by using fewer passes to complete the routing of trenches of different widths. The embodiments also allow for more flexibility in system accuracy and repeatability to successfully merge trenches of different widths. Further, the embodiments significantly improve depth control within the transition region from one trench width to another.

It will be understood by those having skill in the art that many changes may be made to the details of the above-described embodiments without departing from the underlying principles of the invention. The scope of the present invention should, therefore, be determined only by the following claims.

The invention claimed is:

1. A system for cutting a trench of multiple widths in a material with a single pass of a laser beam, the system comprising:
 a laser source to generate the laser beam;
 a first optical component to receive the laser beam, wherein the first optical component is selectively adjustable to change a position of a focal plane with respect to a work surface of the material; and
 a second optical component to direct the laser beam to the work surface of the material; and
 a beam positioner subsystem configured to establish:
  a first cutting speed of the laser beam with respect to the work surface, the first cutting speed corresponding to a first trench width to be cut in the work surface by the laser beam at a beginning of a transition region, the first trench width defined by a first series of laser pulses, each laser pulse in the first series having a first spot size at the work surface;
  a second cutting speed of the laser beam with respect to the work surface, the second cutting speed corresponding to a second trench width to be cut into the work surface by the laser beam at an end of the transition region, the second trench width defined by a second series of laser pulses, each laser pulse in the second series having a second spot size at the work surface; and
  a gradual change, according to a continuously changing cutting speed temporal profile, between the first and second cutting speeds while the first optical component undergoes a series of changes to sequentially change spot sizes at the work surface as a function of time on a per pulse basis from the first spot size to the second spot size.

2. The system of claim 1, wherein the beam positioner subsystem comprises a chuck to hold the material during processing by the laser beam, wherein relative movement between the chuck and the laser beam incident on the work surface determines the cutting speed.

3. The system of claim 1, wherein the beam positioner subsystem comprises beam steering optics to receive the laser beam from the first optical component and to selectively redirect the laser beam to the second optical component.

4. The system of claim 1, wherein the first optical component comprises a weak lens configured to move between the laser source and the second optical component, and wherein the series of changes comprises a series of positional movements of the weak lens.

5. The system of claim 1, wherein the first optical component comprises a multi-element lens in which one or more lens elements are configured to move between the laser source and the second optical component, and wherein the series of changes comprises a series of positional movements of the one or more lens elements.

6. The system of claim 1, wherein the first optical component comprises an adaptive lens, and wherein the series of changes comprises sequentially changing a curvature of the adaptive lens.

7. The system of claim 1, wherein the first optical component comprises an adaptive mirror, and wherein the series of changes comprises sequentially changing the curvature of the adaptive mirror.

8. The system of claim 1, wherein the laser beam comprises a plurality of laser pulses having Gaussian spots.

9. The system of claim 1, wherein a pulse repetition frequency (PRF) in the transition region has a temporal profile PRF(t), wherein a spot size at a beginning of the transition region is denoted as SS1, wherein spot sizes in the transition region have a temporal profile SS(t), wherein a bite size at the beginning of the transition region is denoted as delta1, and wherein the continuously changing cutting speed temporal profile in the transition region is Vc(t)=PRF(t)*SS1*delta1/SS(t).

10. The system of claim 1, wherein a pulse repetition frequency (PRF) is substantially constant among the first and second series, wherein a spot size at the beginning of the transition region is denoted as SS1, wherein spot sizes in the transition region have a temporal profile SS(t), wherein a cutting speed at the beginning of the transition region is denoted as Vc1, and wherein the continuously changing cutting speed temporal profile in the transition region is Vc(t)=Vc1*SS1/SS(t).

11. The system of claim 8, wherein a spot size at the beginning of the transition region is denoted as SS1, wherein a bite size at the beginning of the transition region is denoted as delta1, wherein a temporal profile of bite sizes in the transition region is delta(t), and wherein a temporal profile of spot sizes in the transition region is SS(t)=SS1*delta1/delta(t).

12. A system for cutting a trench of multiple widths in a material with a single pass of a laser beam, the system comprising:
  means for cutting a first portion of the trench at a first cutting speed with laser pulses having a first spot size at a work surface of the material;
  means for cutting a second portion of the trench at a second cutting speed with laser pulses having a second spot size at the work surface of the material; and
  means for simultaneously transitioning from the first cutting speed to the second cutting speed according to a continuously changing cutting speed temporal profile, and from the first spot size to the second spot size as a function of time on a per pulse basis, at a transition region between the first portion and the second portion of the trench.

* * * * *